US012665925B2

(12) United States Patent
Boin et al.

(10) Patent No.: US 12,665,925 B2
(45) Date of Patent: Jun. 23, 2026

(54) METHODS AND SYSTEMS FOR DETECTING DENIAL OF SERVICE ATTACKS ON A NETWORK

(71) Applicant: OVH, Roubaix (FR)

(72) Inventors: Clement Boin, Lille (FR); Gilles Grimaud, Lille (FR); Xavier Guillaume, Roubaix (FR); Michael Hauspie, Seclin (FR); Tristan Groleat, Brest (FR)

(73) Assignee: OVH, Roubaix (FR)

( * ) Notice: Subject to any disclaimer, the term of this patent is extended or adjusted under 35 U.S.C. 154(b) by 20 days.

(21) Appl. No.: 18/813,195

(22) Filed: Aug. 23, 2024

(65) Prior Publication Data

US 2025/0080575 A1      Mar. 6, 2025

(30) Foreign Application Priority Data

Aug. 30, 2023    (EP) ..................................... 23306436

(51) Int. Cl.
H04L 9/40              (2022.01)

(52) U.S. Cl.
CPC ...... H04L 63/1458 (2013.01); H04L 63/1416 (2013.01); H04L 63/1425 (2013.01)

(58) Field of Classification Search
CPC .............. H04L 63/1458; H04L 63/1416; H04L 63/1425; H04L 2463/141; H04L 2463/142
See application file for complete search history.

(56) References Cited

U.S. PATENT DOCUMENTS

| | | | | |
|---|---|---|---|---|
| 5,421,030 A | * | 5/1995 | Baran | ...................... H04N 7/10 |
| | | | | 379/92.03 |
| 8,555,388 B1 | * | 10/2013 | Wang | ...................... H04L 69/22 |
| | | | | 713/188 |
| 9,055,095 B2 | * | 6/2015 | Murthy | ............... H04L 63/1458 |
| 10,015,177 B2 | | 7/2018 | Muddu et al. | |
| 10,581,902 B1 | * | 3/2020 | Krishtal | ............. H04L 63/0236 |
| 11,190,543 B2 | * | 11/2021 | Lazarescu | ............. G06F 21/554 |
| 11,470,112 B2 | * | 10/2022 | Gingold | .................. H04L 51/42 |

(Continued)

FOREIGN PATENT DOCUMENTS

EP          2854366 B1 * 12/2017 ........... H04L 67/303

OTHER PUBLICATIONS

European Search Report to the counterpart EP Patent Application No. 23306436.9 completed on Nov. 29, 2023.

(Continued)

*Primary Examiner* — John B King
(74) *Attorney, Agent, or Firm* — BCF LLP

(57)          ABSTRACT

Method and system for detecting a Denial-of-Service (DoS) attack on a network. The method includes sampling a traffic carried by the network between data processing devices, the traffic comprising data packets transmitted between the data processing devices, determining statistically estimated features of the traffic based on the sampling thereof, executing one or more heuristic algorithm based on the statistically estimated features, the one or more heuristic algorithms being configured to generate a confidence score indicative of a probability that at least some of the data packets constitute a DoS attack and comparing the confidence score with a confidence threshold to determine whether a mitigation order is to be generated.

16 Claims, 7 Drawing Sheets

(56) References Cited

U.S. PATENT DOCUMENTS

| | | | | |
|---|---|---|---|---|
| 12,386,958 | B2 * | 8/2025 | Radu | G06F 21/552 |
| 2007/0283436 | A1 | 12/2007 | Duffield et al. | |
| 2008/0239956 | A1 * | 10/2008 | Okholm | H04L 47/2441 |
| | | | | 370/232 |
| 2008/0291915 | A1 * | 11/2008 | Foschiano | H04L 63/1441 |
| | | | | 370/392 |
| 2012/0079592 | A1 * | 3/2012 | Pandrangi | H04L 47/10 |
| | | | | 709/224 |
| 2014/0090058 | A1 * | 3/2014 | Ward | H04L 63/1433 |
| | | | | 726/23 |
| 2016/0088013 | A1 * | 3/2016 | Watson | H04L 63/0227 |
| | | | | 726/25 |
| 2018/0351965 | A1 * | 12/2018 | Mehr | G06F 21/552 |
| 2020/0364664 | A1 * | 11/2020 | Chen | G06N 20/00 |
| 2024/0146750 | A1 * | 5/2024 | Methner | H04L 63/1416 |
| 2024/0323224 | A1 * | 9/2024 | Boin | H04L 63/1425 |

OTHER PUBLICATIONS

Oshima et al., "Early DoS/DDOS Detection Method using Short-term Statistics," 2010 International Conference on Complex, Intelligent and Software Intensive Systems, Poland, 2010, pp. 168-173, doi: 10.1109/CISIS.2010.53.

Gupta et al., "An ISP Level Solution to Combat DDoS Attacks using Combined Statistical Based Approach", 2012, doi : 10.48550/ARXIV. 1203.2400.

Oshima et al., "DDoS Detection Technique Using Statistical Analysis to Generate Quick Response Time," 2010 International Conference on Broadband, Wireless Computing, Communication and Applications, Japan, 2010, pp. 672-677, doi: 10.1109/BWCCA. 2010.153.

Feinstein et al., "Statistical approaches to DDOS attack detection and response," Proceedings DARPA Information Survivability Conference and Exposition, Washington, USA, 2003, pp. 303-314 vol. 1, doi: 10.1109DISCEX.2003.1194894.

Singh et al., "Threshold-based distributed DDoS attack detection in ISP networks", Elektrik, vol. 26, No. 4, Jul. 27, 2018, pp. 1796-1811.

Haseeb-Ur-Rehman et al., "High-Speed Network DDoS Attack Detection: A Survey", Sensors, vol. 23, No. 15, Aug. 2023, pp. 1-25.

* cited by examiner

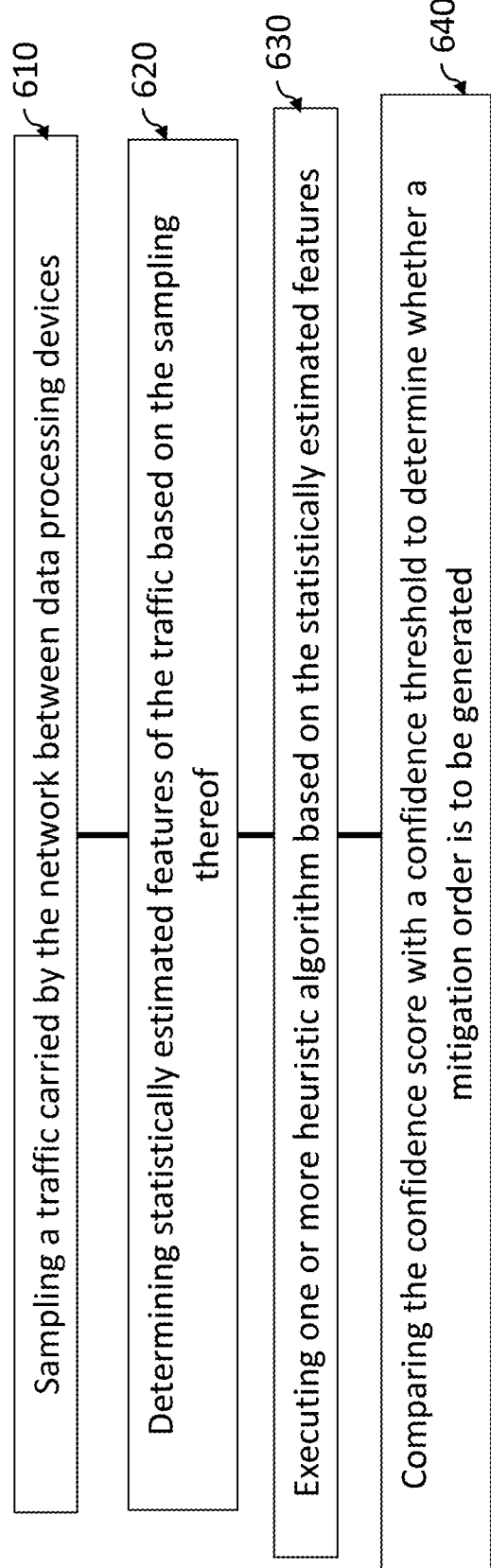

600

610

Sampling a traffic carried by the network between data processing devices

620

Determining statistically estimated features of the traffic based on the sampling thereof

630

Executing one or more heuristic algorithm based on the statistically estimated features

640

Comparing the confidence score with a confidence threshold to determine whether a mitigation order is to be generated

Figure 6

METHODS AND SYSTEMS FOR DETECTING DENIAL OF SERVICE ATTACKS ON A NETWORK

CROSS-REFERENCE TO RELATED APPLICATION

This application claims priority to European Patent Application No. 23306436.9, filed on Aug. 30, 2023, entitled "METHODS AND SYSTEMS FOR DETECTING DENIAL OF SERVICE ATTACKS ON A NETWORK," which is incorporated herein by reference in its entirety.

FIELD

The present technology relates to the field of Internet security. In particular, the systems and methods for detecting Denial of Service (DoS) attacks on a network are disclosed.

BACKGROUND

Due to the growing coverage of cloud computing, more and more Internet services rely on cloud providers to ensure availability of their services. Malicious attempts to disrupt the normal traffic of a targeted server, service or network are one of the main threats against service availability. Denial of Service (DoS) attacks are ones of the most widespread attacks.

A botnet including a large number of bots can be used to cause a denial of service (DoS) attack on a service provider, for example a server. A DoS attack causes the service provider to be flooded with superfluous requests. When under such an attack, the service provider processing and communicating capabilities may become so overloaded that it is temporarily unable to provide service to legitimate users and clients. Because the attack is delivered through a large number of sources, i.e. a large number of bots, having thousands of distinct Internet Protocol (IP) addresses, blocking the attack cannot be achieved by blocking a single source. Given that a DoS attack may involve such large numbers of IP addresses, some of which being assigned to devices that were legitimate before being infected, a simple blacklisting of potentially harmful IP addresses is not an efficient solution. IP addresses are frequently dynamically assigned, so blacklisting may lead to eventually blocking legitimate devices.

These attacks may be volumetric (high data rates) or targeted on specific application vulnerabilities (low data rates). A high-rate traffic attack may be hard to differentiate from flash-crowd events as the differences in characteristics between the two may be small and require a knowledge of a nominal traffic at the service provider. On the other hand, low-rate attacks can be hard to differentiate from legitimate traffic because attacks of this type tend to mimic legitimate traffic to get past the detection systems. Moreover, the relatively high computational resource of these algorithms usually makes them unsuitable for standard detection and/or mitigation operations. Indeed, time is often critical when it comes to malicious connection attempts. Conventional detection and/or mitigation solutions are slow to react. Lastly, the cost of implementing effective DoS detection solutions can be prohibitively expensive given that DoS detection solutions usually require significant computing resources, specialized hardware, and expertise to deploy and manage effectively.

Therefore, a system for detecting a Denial-of-Service (DoS) attack on a network with low computer complexity requirements is desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Implementations of the present technology have been developed based on developers' appreciation of shortcomings associated with the prior art. In particular, such shortcomings may comprise the delays of current detection and/or mitigation solutions that may actually exceed the duration of a DoS attack.

In a first broad aspect, various implementations of the present technology provide a computer-implemented method for detecting a Denial-of-Service (DoS) attack on a network, The computer-implemented method includes sampling a traffic carried by the network between data processing devices, the traffic comprising data packets transmitted between the data processing devices, determining statistically estimated features based on the sampled traffic, executing a heuristic algorithm based on the statistically estimated features, the heuristic algorithms being configured to generate a confidence score indicative of a probability that at least some of the data packets constitute a DoS attack and comparing the confidence score with a confidence threshold to determine whether a mitigation order is to be generated.

Broadly speaking, the systems and methods described herein provide DoS detection by determining statistically estimated features and executing heuristic algorithms based on the statistically estimated features. As will be described in greater details, a number of heuristic algorithms and/or a number of samples collected from the traffic may be adjusted based on a confidence score about detection of a DoS attack, thus enabling adjustment of a computer complexity.

In some non-limiting implementations, the traffic is continuously sampled.

In some non-limiting implementations, the statistically estimated features are periodically updated based on samples of the traffic collected during a duration of a pre-determined period of time.

In some non-limiting implementations, the statistically estimated features are determined based on the sampling of the traffic being sampled during a duration of a pre-determined time span.

In some non-limiting implementations, the confidence threshold is a first confidence threshold, the computer-implemented method further comprising comparing the confidence score with a second confidence threshold to determine whether a network access granting to the network is to be generated.

In some non-limiting implementations, the heuristic algorithm is a first heuristic algorithm and the method further includes storing, in response to the confidence threshold being between the first and second thresholds, information about an output of the first heuristic algorithm, collecting additional samples of the traffic, determining additional statistically estimated features, executing at least one of the first and a second the heuristic algorithm based on the additional statistically estimated features and updating the confidence score based on an output of the at least one of the first and the second heuristic algorithm.

In some non-limiting implementations, the heuristic algorithm includes a first and second heuristic algorithms, the first heuristic algorithm receiving the statistically estimated features as an input, the second heuristic algorithm receiving an output of the first heuristic algorithm as an input.

In some non-limiting implementations, the first heuristic algorithm is configured to extract curated statistically estimated features from the statistically estimated features and the second heuristic algorithm is configured to generate a confidence score based on the curated statistically estimated features.

In some non-limiting implementations, the heuristic algorithm comprises a plurality of heuristic algorithms, two or more of the heuristic algorithms receiving same statistically estimated features as an input.

In some non-limiting implementations, a given statistically estimated feature is a number of data packets transmitted or received by the data processing devices.

In some non-limiting implementations, a given statistically estimated feature is a number of data bytes transmitted or received by the data processing devices.

In some non-limiting implementations, sampling the traffic comprises employing a sampling module relying on NetFlow protocol and/or sFlow protocol.

In some non-limiting implementations, sampling the traffic comprises determining a sampling rate for sampling the traffic.

In some non-limiting implementations, the sampling rate is based on at least one of a rate of the traffic and/or a pre-determined confidence interval to detect the DoS attack.

In some non-limiting implementations, the statistically estimated features comprises information about at least one of source IP addresses of data processing devices that emitted the data packets, source ports of the data processing devices that emitted the data packets, destination IP addresses of data processing devices that emitted the data packets, destination ports of the data processing devices that emitted the data packets, and/or protocols used for communication between the data processing devices.

In a second broad aspect, various implementations of the present technology provide a system for detecting a Denial-of-Service (DoS) attack on a network, the system including a controller and a memory storing a plurality of executable instructions which, when executed by the controller, cause the system to perform the method.

In a third broad aspect, various implementations of the present technology provide a non-transitory computer-readable medium comprising computer-readable instructions that, upon being executed by a system, cause the system to perform the method.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference

Figure 1:
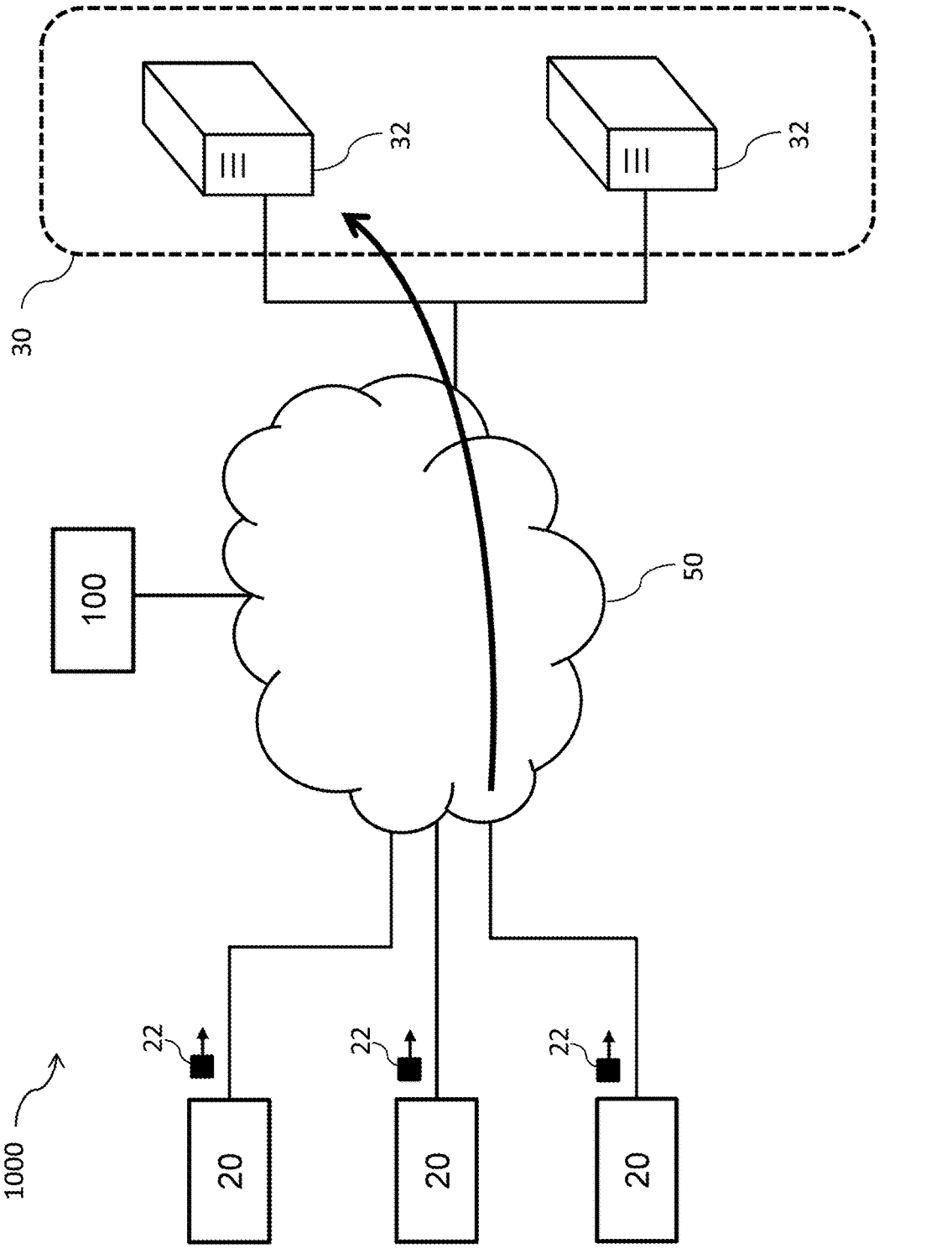
Figure 2:
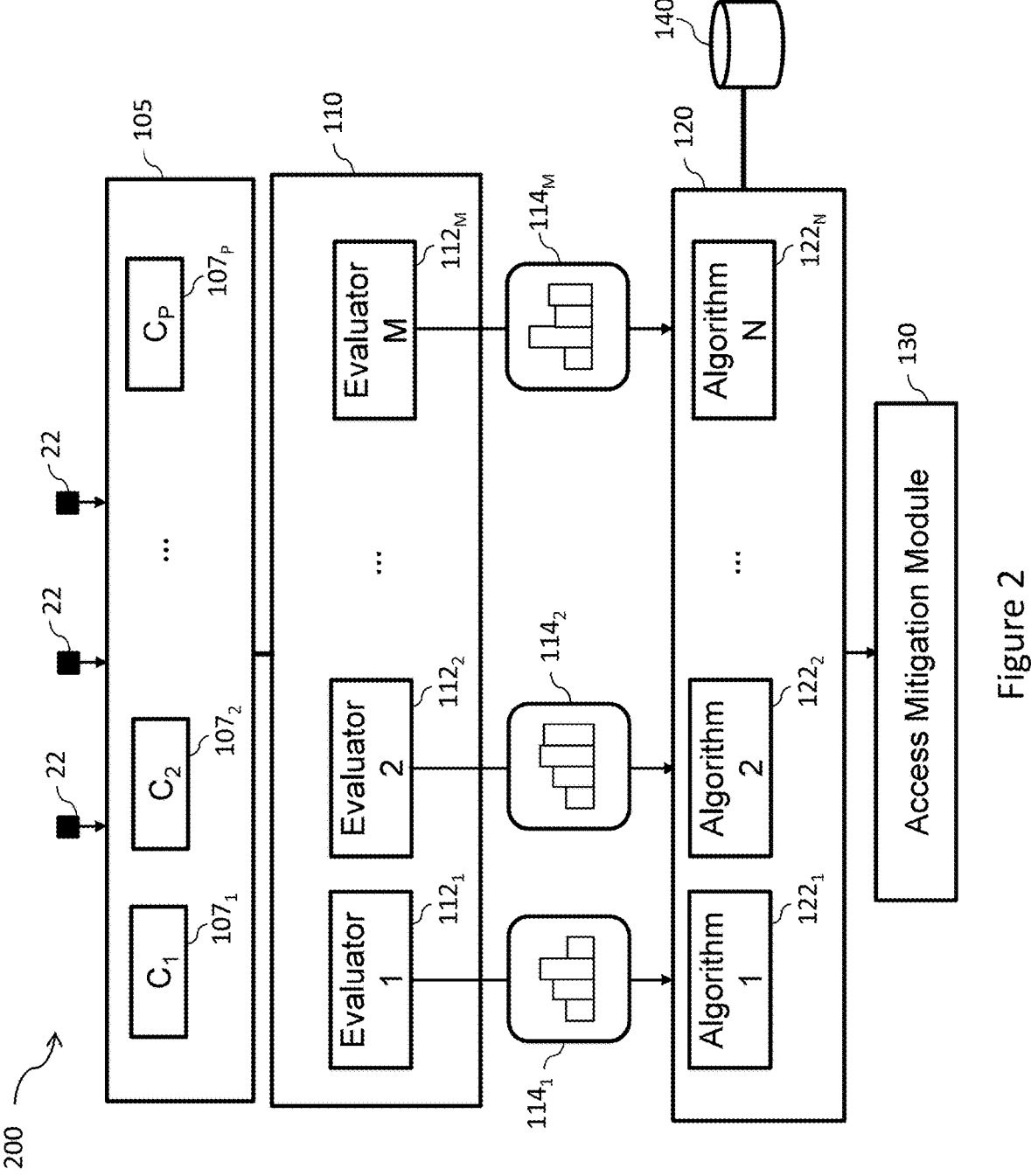
Figure 3:
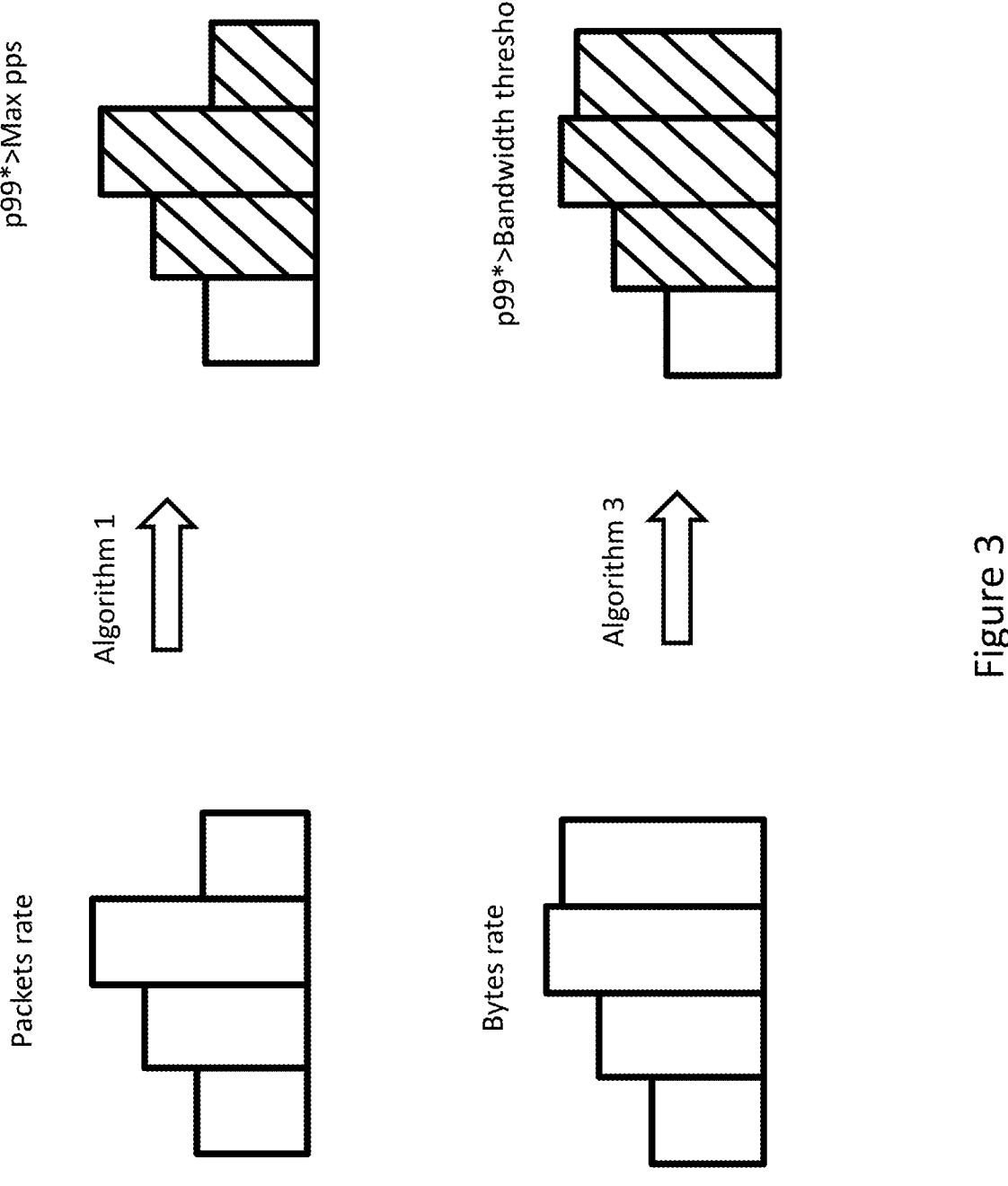
Figure 4:
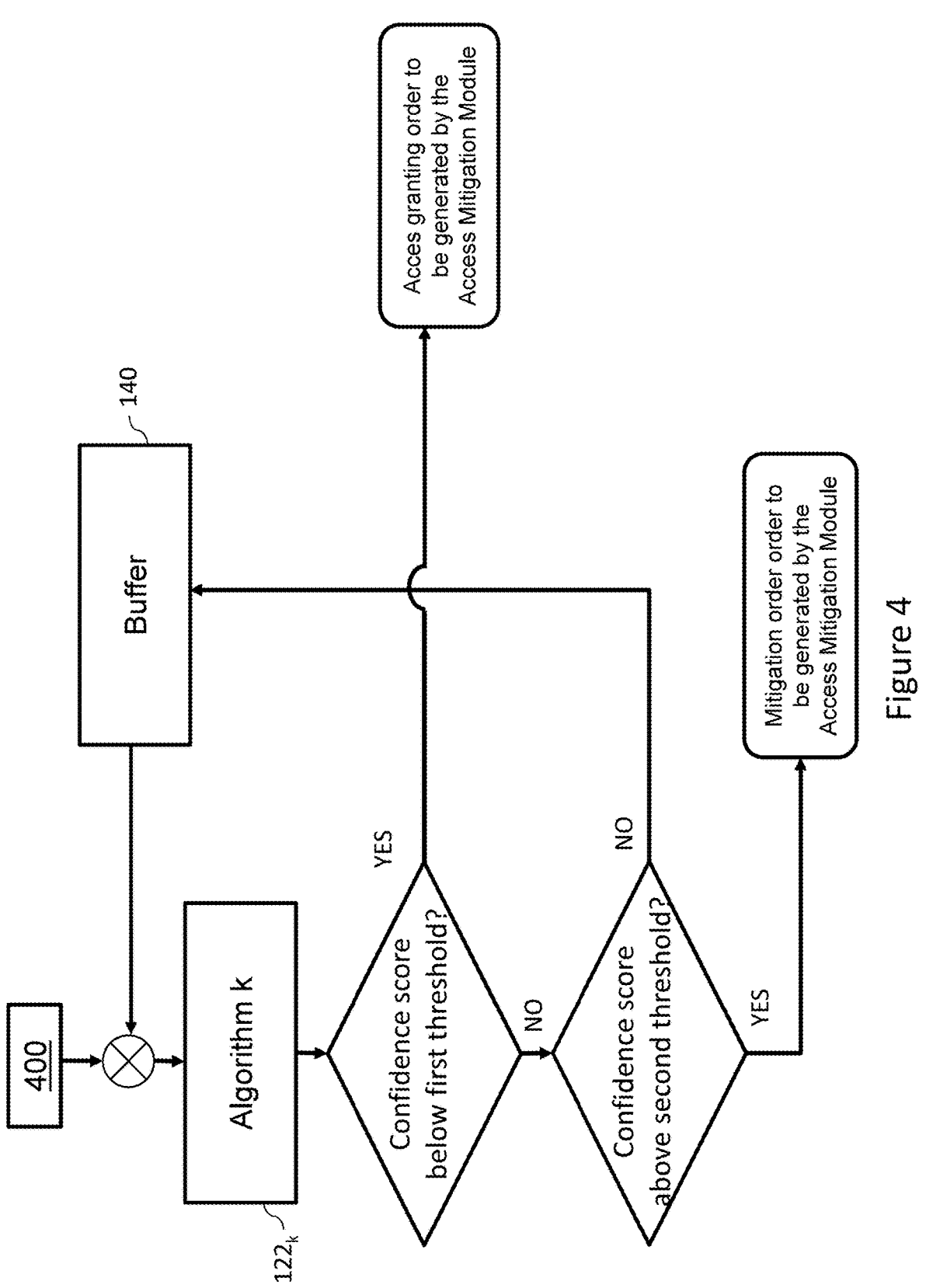
Figure 5:
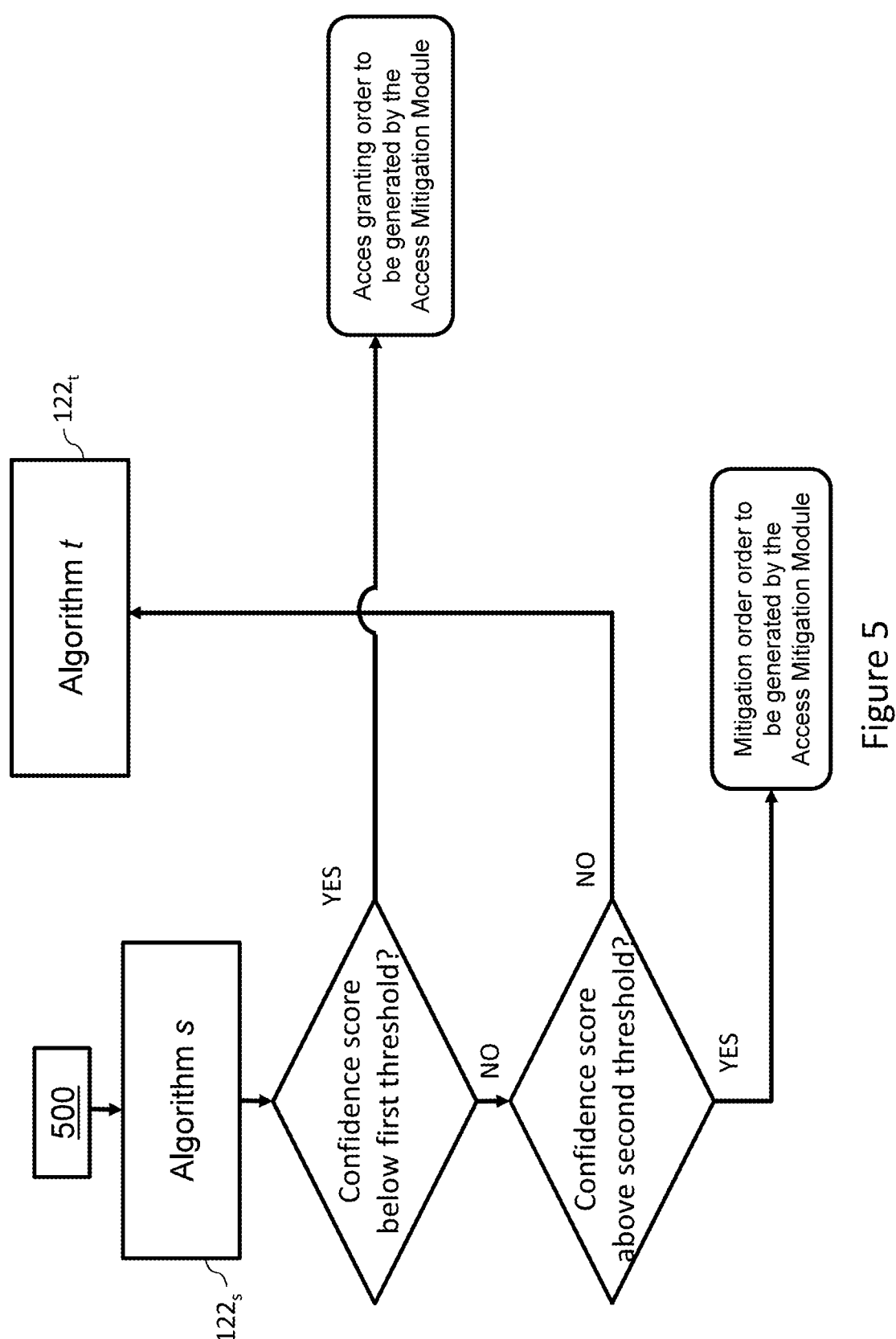
Figure 7:
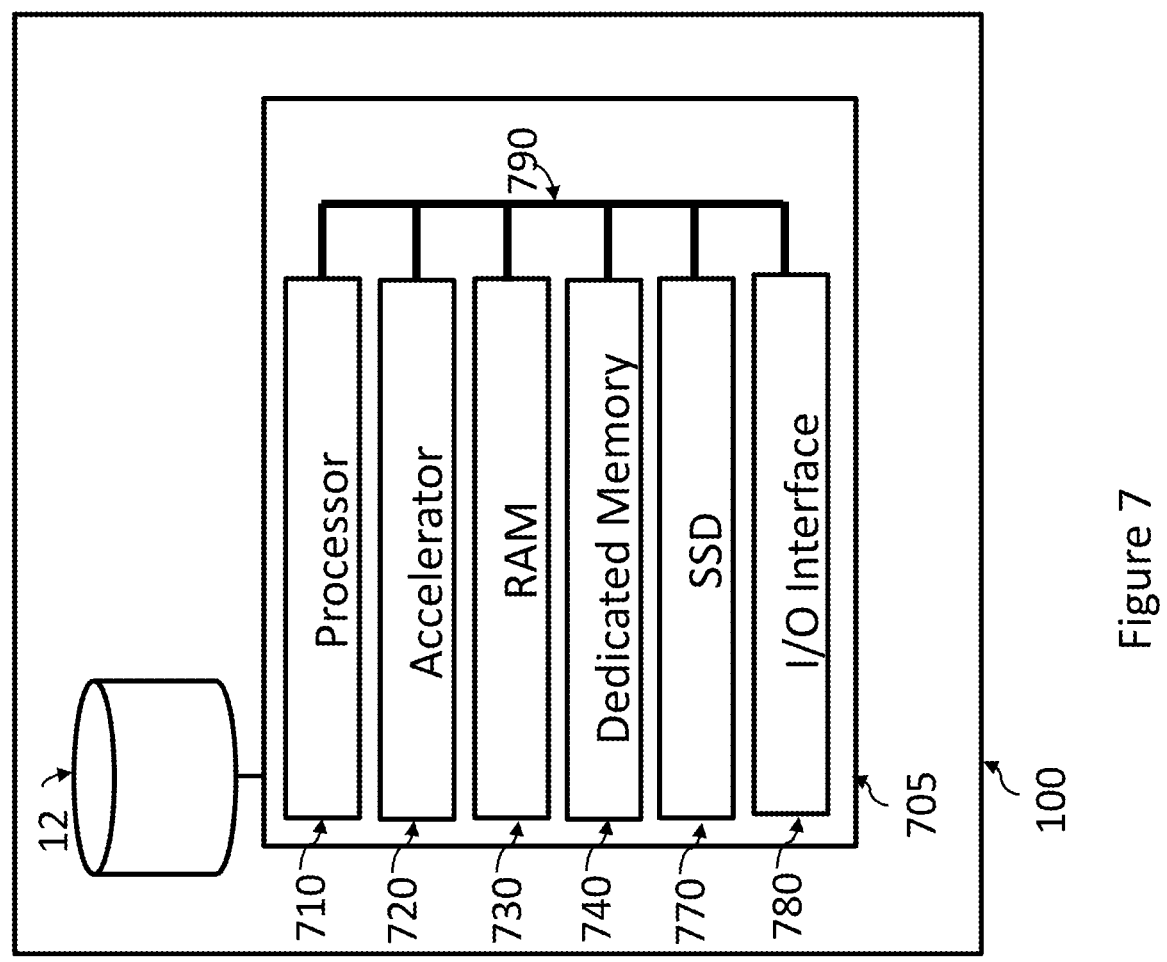

4 is made to the following description which is to be used in conjunction with the accompanying drawings, where:

FIG. 1 is a schematic representation of a communication environment in accordance with some non-limiting implementations of the present technology;

FIG. 2 is a block diagram of a system for detecting a Denial-of-Service (DoS) attack on a network in accordance with some non-limiting implementations of the present technology;

FIG. 3 illustrates two non-limitative examples of inputs and outputs of two heuristic algorithms executed by the system of FIG. 2;

FIG. 4 is a high-level flowchart representing operations of an execution of a heuristic algorithm of the system of FIG. 2 in accordance with some non-limiting implementations of the present technology;

FIG. 5 is a high-level flowchart representing operations of an execution of another heuristic algorithm of the system of FIG. 2 in accordance with some non-limiting implementations of the present technology;

FIG. 6 is a sequence diagram showing operations of a computer-implemented method for detecting a Denial-of-Service (DoS) attack on a network in accordance with some non-limiting implementations of the present technology; and FIG. 7 is a block diagram of an electronic device in accordance with some non-limiting implementations of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

In the context of the present disclosure, a Denial-of-Service (DoS) refers to a malicious attack on a data processing component and may be a Distributed Denial-of-Service (DDoS) attack. In other words, a DDoS attack is a DoS attack in which numerous computers or machines flood a targeted resource.

In the context of the present disclosure, a collecting time, or "sampling time" of a system with respect to a traffic of data, or a "data flow" is a period of time during which the system collects information about the traffic of data. The sampling time may be associated with a corresponding time span and/or a sample rate. For example and without limitations, the system may collect, during the collecting time, data packets of the traffic of data and/or metadata associated therewith.

With these fundamentals in place, we will now consider some non-limiting examples of the present technology.

FIG. 1 is a schematic representation of a communication environment 1000 in which a plurality of devices 20 are communicably connected to an infrastructure 30 over a communication network 50 via any wired or wireless communication link including, for example, 4G, LTE, Wi-Fi, or any other suitable connection. The communication network 50 may be referred to as an "access network" of the infrastructure 30.

The infrastructure 30 may for example represent a data center, or a plurality of data centers, providing hosting services for one or more customers. As such, the infrastructure 30 may be referred to as a "service provider". It will be appreciated that the infrastructure 30 may include a large number of servers for hosting services for a large number of customers and that the infrastructure 30 may be distributed over a plurality of datacenters (not shown) for redundancy, reliability and/or load sharing purposes. The datacenters forming the infrastructure 30 may be geographically distributed, for example worldwide. The illustrated infrastructure 30 of FIG. 1 is heavily simplified for case of illustration.

In some implementations, all components of the infrastructure 30 may be co-located in a same installation, for example being part of a same datacenter. In another implementation, some of the components of the infrastructure 30 may be distant from other components of the infrastructure 30, geographically separated components of the infrastructure communicating via the Internet or via a private network. In an illustrative but non-limiting example, servers providing services to customers of the infrastructure may be installed in large numbers in many locations while, in the same example, components of the system for defending against DoS attacks may be installed in a limited number of locations.

In some non-limiting implementations of the present technology, the communication network 50 may be implemented as the Internet. In other implementations of the present technology, the communication network 50 can be implemented differently, such as any wide-area communication network, local-area communication network, a private communication network and the like. How the communication links between the devices 20 and the infrastructure 30 are implemented will depend inter alia on how the devices 20 and the infrastructure 30 are implemented. The infrastructure 30 includes one or more data processing entity 32 (e.g. servers) to provide a given service to the devices 20. In some non-limiting implementations, the infrastructure 30 is a datacenter.

In use, each device 20 may transmit, over the communication network 50, a connection request 22 to the infrastructure 30 to establish a communication session therewith. The ensemble of the connection requests for the infrastructure 30 may be referred to as a "traffic" for that infrastructure 30, the traffic being formed of data packets. However, in some instances, one or more malicious devices 20 may transmit malicious connection requests that are part of a DoS attack. For example, a given malicious device 20 or a group of malicious devices 20 may transmit a substantially high number of concurrent connection requests to make the infrastructure 30, a given data processing entity 32 thereof or a group of data processing entities 32, unavailable to other devices 20 by temporarily or indefinitely disrupting services of the infrastructure 30.

In the context of the present disclosure, a given data processing entity 32 or a group of data processing entities 32, physical and/or virtual, to which a device 20 desires to establish a communication session with is referred to as a "destination device" for that device 20. For example, a data processing entity 32 may be hardware equipment (e.g. a server) or a service (e.g. a website or a database) provided by hardware equipment.

In order to mitigate attacks on the infrastructure 30, the communication environment 1000 includes a system 100 communicably connected to the infrastructure 30. An implementation of the system 100 is described in greater details herein after. In some implementations, the system 100 is part of the infrastructure 30. For example and without limitation, the system 100 may be operated by one or more servers. In alternative non-limiting implementations of the present technology, the functionality of the system 100 may be distributed and may be implemented via multiple servers.

Even though the system 100 is depicted separately from the service provider, functions of the system 100 described herein may be performed by the infrastructure 30.

As will be described in greater details herein below, the system 100 may execute a detection pipeline that may leverage different computational resources at different stages of the detection pipeline, and may effectively prevent DoS attacks and recognize them before they can cause considerable damages to the service provider. The system 100 may receive and analyse connection requests 22 before or while a communication session is established between the devices 20 that transmitted connection requests 22 and the infrastructure 30. The system 100 may thus prevent a communication session to be established or maintained in response to a malicious network event being identified. As it will be described in greater details herein after, the system 100 may execute a access mitigation module (see FIG. 2) in response to a DoS attack being detected or that no DoS attack is detected.

FIG. 2 is a block diagram of a detection pipeline 200 that may be executed by the system 100. In this implementation, each connection request 22 transmitted by a given device 20 desiring to establish a communication session with a target device includes a communication dataset including:

- information about a source IP address of the given device 20;
- information about a source port of the given device 20;
- information about a destination IP address of a corresponding destination device;
- information about a destination port of the corresponding destination device; and
- information about a protocol used for communication between the given device 20 and the corresponding destination device.

Sampling Module

The detection pipeline 200 includes a sampling module 105 that receives the connection requests 22, or "network events", and extract the above information therefrom. Broadly speaking, the sampling module 105 samples the traffic and extracts features $107_1$-$107_P$ therefrom. A given feature may be for example a byte rate, or a data packet rate of the traffic. The sampling module 105 may sample the traffic during a pre-determined time window (e.g. 10 ms) to generate a set of extracted features $107_1$-$107_P$ therefrom. The sampling module 105 may continue to sample the traffic during a second time window to update the set extracted features $107_1$-$107_P$. In other words, the extracted features $107_1$-$107_P$ may be periodically updated at a pre-determined frequency (e.g. that is an inverse of the time window).

For example and without limitation, the sampling module 105 may cluster connection requests based on the source IP address, the destination IP address, the destination port and/or the source port of each of the connection requests 22. For example, connection requests 22 having a first destination IP address are clustered by the sampling module 105 as a first connection cluster, and connection requests 22 having a second destination IP address are clustered by the sampling module 105 as a second connection cluster. Sub-clusters may also be identified by the sampling module 105. For example, connection requests 22 having the first destination IP address and a first source IP address are identified by the sampling module 105 as a first sub-cluster of the first connection cluster, and connection requests 22 having the first destination IP address and a second source IP address are identified by the sampling module 105 as a second sub-cluster of the first connection cluster.

Broadly speaking, the sampling module 105 may deserialize network events and merge them into a given data format used by the system 100 for statistical analysis thereof. This module handles different input formats as they can vary depending on the type of equipment from which the connection requests are received. For example, the network events may have a NetFlow data format, a sFlow data format or any other suitable data format. In other words, the sampling module may rely on the NetFlow protocol, the sFlow protocol or any other protocol.

In some implementation, the sampling module 105 converts a data format of the received connection requests into a same given data format. This may further case an analysis thereof in the detection pipeline 200. For example, a first connection request received at the sampling module 105 may have a NetFlow data format, and a second connection request received at the sampling module 105 may have a sFlow data format. The sampling module 105 may optionally convert the data formats of the first and second connection requests into another data format prior determining whether or not the first and second connection requests belong to a same connection cluster.

It should be noted that a sampling rate of the sampling module 105 on the traffic may be dynamically adjusted based on characteristics of the detection and/or characteristics of the DoS attack to be detected. For example and without limitation, the sampling rate may be based on at least one of a rate of the data flow, and a pre-determined confidence interval to detect the DoS attack.

Broadly speaking, relatively huge volumes of data, reaching several terabytes per second, may have to be processed by the infrastructure 30. Therefore, it may be impractical to process each packet individually to monitor the traffic. Some of the existing sampling strategies such as sFlow or Netflow may reduce or even smooth out the traffic peaks associated with DoS attacks, in addition to providing a partial view of the information transiting to the infrastructure 30. The aforementioned sampling rate aims at solving this problem.

It should be noted that if the sampling rate is too low, it may compromise an ability of the detection pipeline 200 to differentiate between malicious and legitimate traffic. To remedy this situation, the sampling rate may be dynamically adjusted based on at least one of a rate of the data flow, and a pre-determined confidence interval to detect the DoS attack, in order to reduce the smoothing effect associated with sampling and obtain more accurate information for determining the legitimacy of the traffic being inspected. The dynamic adjustment may improve the detection process by optimizing the detection pipeline 200 while ensuring finer, more precise management of traffic in the infrastructure 30.

Statistical Estimation Module

The detection pipeline further includes a statistical estimation module 110 that receives the extracted features $107_1$-$107_P$ from the sampling module 105. Broadly speaking, the statistical estimation module 110 generates statistical data from the discrete sampled extracted features $107_1$-$107_P$.

More specifically, the statistical estimation module 110 includes one or more evaluator, or "evaluating modules" $112_1$-$112_M$. M evaluating modules are depicted in the illustrative implementation of FIG. 2. In use, each evaluating module $112_i$ may receive one or more extracted features from the sampling module 105 and generate statistically estimated features therefrom.

In some implementation, each evaluating module $112_i$ generates a corresponding set $114_i$ of statistically estimated features. For example, the extracted feature $107_1$ may be indicative of a number and identification of different source IP address that send connexion requests 22 to a given same destination IP address. In this example, 1000 connexion requests 22 may have been flagged as including the given destination IP address during a given period of time. In response to determining that 20 connexion requests 22 out of the 1000 were emitted by a same source IP address, the evaluating module $112_1$ (or any other evaluating module) may generate a statistical dataset $114_i$ indicative that 2% of the source IP addresses for that destination IP address are said same source IP address, or that any source IP address sending a connexion request 22 to the destination IP address has 2% chance to be said same source IP address.

It can thus be said that the statistical estimation module 110 extrapolates information included in the extracted features $107_1$-$107_P$ by generating statistical data therefrom. In some implementations, the statistically estimated features are periodically updated, once the extracted features $107_1$-$107_P$ are updated, based on samples of the traffic collected during a duration of a pre-determined period of time. It can thus be said that the sets $114_1$-$114_M$ of statistically estimated features are determined based on the sampling of the traffic being sampled during a duration of a pre-determined time span. In the illustrative implementation of FIG. 2, the statistical datasets $114_i$ are depicted as histograms, but this aspect is non-limitative.

Detection Module

The detection pipeline 200 further includes a detection module 120 that receives the set $114_i$ of statistically estimated features from the statistical estimation module 110. Broadly speaking, the detection module 120 parses through the sets $114_i$ of statistically estimated features using one or more heuristic detection algorithms, depicted as algorithms $122_1$-$122_N$, to detect anomalies in the traffic and notably DoS attacks.

The detection module 120 executes one or more of the heuristic detection algorithms $122_1$-$122_N$ that the one or more heuristic algorithms to detect anomalies in the traffic. More specifically, the heuristic algorithms $122_1$-$122_N$ generate a confidence score indicative of a probability that at least some of the flows of the traffic constitute a DoS attack. Some of the heuristic algorithms $122_1$-$122_N$ may be executed in parallel and/or in series. It can be said that a given heuristic algorithm $122_i$ uses the input sets of statistically estimated features and potential meta-data received from the statistical estimation module 110, from another heuristic algorithm $122_i$ or from an external data source communicably connected to the system 100, to generate a confidence score indicative of a probability that a given anomaly it is meant to detect is happening.

The detection module 120 is communicably connected to a memory 140 of the system 100 in which the confidence scores, the confidence thresholds, the received sets of statistically estimated features and/or any other data suitable for performing the recited operations of the detection module 120.

The detection pipeline 200 further includes an access mitigation module 130 that receives the confidence scores of the detection module 120. Execution of the access mitigation module 130 may include generation of a mitigation order to prevent a DoS attack from occurring. For example, the access mitigation module 130 may compare a given confidence score with one or more confidence thresholds to determine if (i) a mitigation order should be generated and/or (ii) if a network access granting to the network should be generated. For example, an illustrative representation of inputs and output of two of the heuristic algorithms $122_1$-$122_N$ are depicted on FIG. 3.

In this example, the heuristic algorithm $122_1$ receives a set of statistically estimated features representative of a distribution of a number of data packets received by the infrastructure 30 per unit of time. The heuristic algorithm $122_1$ detects if the $99^{th}$ percentile of the distribution is above a packet rate threshold (denoted "Max pps"). The heuristic algorithm $122_1$ may generate a confidence score based on the set of statistically estimated features and, in addition or optionally, a confidence interval associated therewith. As such, the access mitigation module 130 may cause generation of a mitigation order in response to the $99^{th}$ percentile of the distribution being above the packet rate threshold.

Also in this example, the heuristic algorithm $122_3$ receives a set of statistically estimated features representative of a distribution of a number of bytes received by the infrastructure 30 per unit of time. The heuristic algorithm $122_3$ detects if the $99^{th}$ percentile of the distribution is above a bandwidth threshold. The heuristic algorithm $122_1$ may generate a confidence score based on the set of statistically estimated features and, in addition or optionally, a confidence interval associated therewith. As such, the access mitigation module 130 may cause generation of a mitigation order in response to the $99^{th}$ percentile of the distribution being above the bandwidth threshold.

Illustrative execution of heuristic algorithm will now be described with reference to FIGS. 4 and 5. More specifically, FIG. 4 is a high-level flowchart representing operations of an execution of a heuristic algorithm $122_k$ in accordance with some non-limiting implementations of the present technology. In this implementation, the heuristic algorithm $122_k$ receives a set 400 of statistically estimated features as an input and generates a confidence score therefrom indicative of a probability that at least some of the flows of the traffic constitute a DoS attack. In response to the confidence score being below a first threshold, a network access granting to the network is generated by the access mitigation module 130. In response to the confidence score being above a second threshold, a mitigation order is generated by the access mitigation module 130.

As illustrated on FIG. 4, in response to the confidence score being above the first threshold and below the second threshold, the confidence score, and data associated therewith such as the set 400, are buffered in a memory communicably connected to the detection module 120 such as the memory 140. In other words, in response to the detection module 120 being uncertain that the set 400 is indicative of a DoS attack, the detection module 120 temporary stores that confidence score and data associated therewith for later update. As show on FIG. 4, the heuristic algorithm $122_k$ may use a subsequent set of statistically estimated features as an input, along with the previously stored confidence score and data associated therewith, to update said confidence score. It can be said that the detection module 120 enables the heuristic algorithm $122_k$ to receive additional input data (i.e., additional sets of statistically estimated features) when said heuristic algorithm $122_k$ is unsure about the occurrence of a DoS attack.

FIG. 5 is a high-level flowchart representing operations of an execution of another heuristic algorithm $122_s$ in accordance with some non-limiting implementations of the present technology. In this implementation, the heuristic algorithm $122_s$ receives a set 500 of statistically estimated features as an input and generates a confidence score therefrom indicative of a probability that at least some of the flows of the traffic constitute a DoS attack. In response to the confidence score being below a first threshold, a network access granting to the network is generated by the access mitigation module 130. In response to the confidence score being above a second threshold, a mitigation order is generated by the access mitigation module 130.

As illustrated on FIG. 5, in response to the confidence score being above the first threshold and below the second threshold, an output of the heuristic algorithm $122_s$ and data associated therewith such as the set 500, are transmitted to another heuristic algorithm $122_t$. For example, an output of the heuristic algorithm $122_s$ may be a set of curated statistically estimated features. The set of curated statistically estimated features may be received by the heuristic algorithm $122_t$ to perform operation thereon and generate a confidence score indicative of a probability that the set 500 constitutes a DoS attack. In other words, the heuristic algorithm $122_s$ may extract curated statistically estimated features from the statistically estimated features and the heuristic algorithm $122_t$ may generate a confidence score based on the curated statistically estimated features.

The heuristic algorithm $122_t$ may have a higher computing complexity or higher computation/storage resource requirements than the heuristic algorithm $122_s$, such that the heuristic algorithm $122_t$ is only triggered when needed (i.e., when the heuristic algorithm $122_s$ is unsure about the occurrence of a DoS attack) to optimise computing resources allocation of the detection module 120 and provide more accurate results. It can be said that the detection module 120 enables the heuristic algorithm $122_k$ to communicate its output to another heuristic algorithm $122_t$ to perform additional operations on the statistically estimated features (e.g., with a higher cost in computing resources) when said heuristic algorithm $122_s$ is unsure about the occurrence of a DoS attack.

FIG. 6 is a flow diagram of a method 600 for detecting Denial of Service (DoS) attacks on a network, such as the communication network 50, according to some implementations of the present technology. In one or more aspects, the method 600 or one or more steps thereof may be performed by a processor or a computer system, such as the system 100. The method 600 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 600 starts with sampling, at operation 610, a traffic carried by the network between data processing devices. As previously described, the traffic includes data packets transmitted between the data processing devices.

For example and without limitations, the communication dataset of a given connection request may include information about a source IP address of a corresponding device, information about a source port of the corresponding device, information about a destination IP address of a corresponding destination device, information about a destination port of the corresponding destination device and information about a protocol used for communication between the corresponding device and the corresponding destination device.

In some implementations, a data format of a given connection request may be a NetFlow data format, a SFlow data format or any other suitable data format.

In the same or other implementations, the traffic is continuously sampled. A sampling rate may be determined to sample the traffic. For example, the sampling rate may be dynamically adjusted based on at least one of a rate of the traffic, and a pre-determined confidence interval to detect the DoS attack.

The method 600 continues with determining, at operation 620, statistically estimated features of the traffic based on the sampling thereof. As such, the statistically estimated features may include information about:

source IP addresses of data processing devices that emitted the data packets, source ports of the data processing devices that emitted the data packets, destination IP addresses of data processing devices that emitted the data packets, destination ports of the data processing devices that emitted the data packets, and/or protocols used for communication between the data processing devices.

The statistically estimated features may be determined based on the sampling of the traffic being sampled during a duration of a pre-determined time span. In some implementations, the statistically estimated features are periodically updated based on newly acquired samples of the traffic collected during a duration of a pre-determined period of time.

For example, a given statistically estimated feature may be a number of data packets transmitted or received by the data processing devices. As another example, another given statistically estimated feature may be a number of data bytes transmitted or received by the data processing devices.

The method 600 continues with executing, at operation 630, one or more heuristic algorithms to the statistically estimated features, such as the heuristic algorithms $122_1$-$122_N$. The one or more heuristic algorithms generate a confidence score indicative of a probability that at least some of the data packets constitute a DoS attack.

In some implementations, a plurality of heuristic algorithms is executed. For example, a first heuristic algorithm may receive statistically estimated features as an input and a second heuristic algorithm may receive an output of the first heuristic algorithm as an input. In other words, the first heuristic algorithm may extract curated statistically estimated features from the statistically estimated features and the second heuristic algorithm may generate a confidence score based on the curated statistically estimated features.

As another example, two or more of the heuristic algorithms receiving same statistically estimated features as an input and be executed in parallel.

The method 600 continues with comparing, at operation 640, the confidence score with a confidence threshold to determine whether a mitigation order is to be generated. In some implementations, the confidence threshold is a first confidence threshold, the method 600 further comprising comparing confidence score with a second confidence threshold to determine whether a network access granting to the network is to be generated. For example, the confidence score may be transmitted to an access mitigation module, such as the access mitigation module 130, that determines whether (i) a mitigation order is to be generated or (ii) an access granting order is to be generated for the data processing devices whose data packets are being analyzed.

In some implementations, the method 600 may further include storing, in response to the confidence threshold being between the first and second thresholds, information about an output of the one or more heuristic algorithms, collecting additional samples of the traffic, determining additional statistically estimated features and executing the one or more heuristic algorithm based on the additional statistically estimated features. This may increase an accuracy of the detection of DoS attack. The method may further include updating the confidence score based on an output of the one or more heuristic algorithm.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It will be appreciated that at least some of the operations of the method 600 may also be performed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

FIG. 7 is a schematic representation of the system 100 in accordance with some non-limiting implementations of the present technology. The system 100 may include additional components in alternative embodiments. Some components may be omitted in alternative embodiments. The system 100 includes a computing unit 705 that may receive the traffic to be analyzed and execute the detection pipeline 200. In some implementations, the computing unit 705 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 705 comprises various hardware components including one or more single or multi-core processors collectively represented by a processor 710, a solid-state drive 770, a random access memory (RAM) 730, a dedicated memory 740 and an input/output interface 780. The computing unit 705 may be a computer specifically designed to analyse traffic to one or more infrastructure such as the infrastructure 30 and detection malicious attacks. The computing unit 705 may be a generic computer system.

In some other embodiments, the computing unit 705 may be an "off the shelf" generic computer system. In some embodiments, the computing unit 705 may also be distributed amongst multiple systems. The computing unit 705 may also be specifically dedicated to the implementation of the present technology. As a person in the art of the present technology may appreciate, multiple variations as to how the computing unit 705 is implemented may be envisioned without departing from the scope of the present technology.

Communication between the various components of the computing unit 705 may be enabled by one or more internal and/or external buses 790 (e.g. a PCI bus, universal serial bus, IEEE 1394 "Firewire" bus, SCSI bus, Serial-ATA bus, ARINC bus, etc.), to which the various hardware components are electronically coupled.

The input/output interface 780 may provide networking capabilities such as wired or wireless access. As an example, the input/output interface 780 may comprise a networking interface such as, but not limited to, one or more network ports, one or more network sockets, one or more network interface controllers and the like. In use, the input/output interface 780 may be used by the system 100 to receive and transmit data through the communication network 50. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 770 stores program instructions suitable for being loaded into the RAM 730 and executed by the processor 710. Although illustrated as a solid-state drive 770, any type of memory may be used in place of the solid-state drive 770, such as a hard disk, optical disk, and/or removable storage media. According to implementations of the present technology, the solid-state drive 770 stores program instructions suitable for being loaded into the RAM 730 and executed by the processor 710 for executing, without being limited to, the detection pipeline 200.

The processor 710 may be a general-purpose processor, such as a central processing unit (CPU) or a processor dedicated to a specific purpose, such as digital signal processor (DSP) for traffic analysis. In some implementations, the processor 710 may also rely on an accelerator 720 dedicated to certain given tasks, such as executing the methods set forth in the paragraphs below. In some implementations, the processor 710 or the accelerator 720 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

The system 100 may comprise a memory 12, that may be the memory 140, communicatively connected to the computing unit 705 and configured to store, for example and without limitation, values of confidence thresholds, inputs and outputs of the heuristic algorithms 122₁-122_N. The memory 12 may be embedded in the device 10 as in the illustrated embodiment of FIG. 7 or located in an external physical location. The computing unit 705 may be configured to access a content of the memory 12 via a network (not shown) such as a Local Area Network (LAN) and/or a wireless connection such as a Wireless Local Area Network (WLAN).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for detecting a Denial-of-Service (DoS) attack on a network, the computer-implemented method comprising:

sampling a traffic carried by the network between data processing devices, the traffic comprising data packets transmitted between the data processing devices;

determining statistically estimated features based on the sampled traffic;

executing a first heuristic algorithm based on the statistically estimated features, the first heuristic algorithm being configured to generate a confidence score indicative of a probability that at least some of the data packets constitute a DoS attack;

comparing the confidence score with a first confidence threshold to determine whether a mitigation order is to be generated;

comparing the confidence score with a second confidence threshold to determine whether to generate an instruction granting access to the network; and after determining that the confidence score is between the first confidence threshold and the second confidence threshold:

storing information about an output of the first heuristic algorithm, collecting additional samples of the traffic, determining additional statistically estimated features, executing the first heuristic algorithm or a second heuristic algorithm based on the additional statistically estimated features, and updating the confidence score based on an output of the first heuristic algorithm or the second heuristic algorithm.

2. The computer-implemented method of claim 1, wherein the traffic is continuously sampled.

3. The computer-implemented method of claim 2, wherein the statistically estimated features are periodically updated based on samples of the traffic collected during a duration of a pre-determined period of time.

4. The computer-implemented method of claim 1, wherein the statistically estimated features are determined based on the sampling of the traffic being sampled during a duration of a pre-determined time span.

5. The computer-implemented method of claim 1, wherein the first heuristic algorithm receives the statistically estimated features as an input, and wherein the second heuristic algorithm receives an output of the first heuristic algorithm as an input.

6. The computer-implemented method of claim 5, wherein:

the first heuristic algorithm is configured to extract curated statistically estimated features from the statistically estimated features; and the second heuristic algorithm is configured to generate a confidence score based on the curated statistically estimated features.

7. The computer-implemented method of claim 1, wherein a given statistically estimated feature is a number of data packets transmitted or received by the data processing devices.

8. The computer-implemented method of claim 1, wherein a given statistically estimated feature is a number of data bytes transmitted or received by the data processing devices.

9. The computer-implemented method of claim 1, wherein sampling the traffic comprises determining a sampling rate for sampling the traffic.

10. The computer-implemented method of claim 9, wherein the sampling rate is based on at least one of a rate of the traffic or a pre-determined confidence interval to detect the DoS attack.

11. The computer-implemented method of claim 1, wherein the statistically estimated features comprise information about at least one of:

source IP addresses of data processing devices that emitted the data packets, source ports of the data processing devices that emitted the data packets, destination IP addresses of data processing devices that emitted the data packets, destination ports of the data processing devices that emitted the data packets, or protocols used for communication between the data processing devices.

12. A system for detecting a Denial-of-Service (DoS) attack on a network, the system comprising at least one processor and memory storing a plurality of executable instructions which, when executed by the at least one processor, cause the system to:

sample a traffic carried by the network between data processing devices, the traffic comprising data packets transmitted between the data processing devices;

determine statistically estimated features based on the sampled traffic;

execute a first heuristic algorithm based on the statistically estimated features, the first heuristic algorithm being configured to generate a confidence score indicative of a probability that at least some of the data packets constitute a DoS attack;

compare the confidence score with a first confidence threshold to determine whether a mitigation order is to be generated;

compare the confidence score with a second confidence threshold to determine whether to generate an instruction granting access to the network; and after determining that the confidence score is between the first confidence threshold and the second confidence threshold:

store information about an output of the first heuristic algorithm, collect additional samples of the traffic, determine additional statistically estimated features, execute the first heuristic algorithm or a second heuristic algorithm based on the additional statistically estimated features, and update the confidence score based on an output of the first heuristic algorithm or the second heuristic algorithm.

13. The system of claim 12, wherein the executable instructions cause the system to continuously sample the traffic.

14. The system of claim 13, wherein the executable instructions cause the system to periodically update the statistically estimated features based on samples of the traffic collected during a duration of a pre-determined period of time.

15. The system of claim 12, wherein the executable instructions cause the system to estimate the statistically estimated features based on the sampling of the traffic being sampled during a duration of a pre-determined time span.

16. A non-transitory computer-readable medium comprising computer-readable instructions that, upon being executed by at least one processor, cause the at least one processor to:

sample a traffic carried by a network between data processing devices, the traffic comprising data packets transmitted between the data processing devices;

determine statistically estimated features based on the sampled traffic;

execute a first heuristic algorithm based on the statistically estimated features, the first heuristic algorithm being configured to generate a confidence score indicative of a probability that at least some of the data packets constitute a DoS attack; and compare the confidence score with a first confidence threshold to determine whether a mitigation order is to be generated;

compare the confidence score with a second confidence threshold to determine whether to generate an instruction granting access to the network;

after determining that the confidence score is between the first confidence threshold and the second confidence threshold:

store information about an output of the first heuristic algorithm, collect additional samples of the traffic, determine additional statistically estimated features, execute the first heuristic algorithm or a second heuristic algorithm based on the additional statistically estimated features, and update the confidence score based on an output of the first heuristic algorithm or the second heuristic algorithm.

* * * * *